(12) United States Patent
Schenck et al.

(10) Patent No.: US 9,291,886 B2
(45) Date of Patent: Mar. 22, 2016

(54) ANIMATED PROJECTION SYSTEM

(71) Applicant: American Tack & Hardware Co., Inc., Saddle River, NJ (US)

(72) Inventors: Grady Schenck, Walden, NY (US); Eileen Toomey, Norwood, NJ (US)

(73) Assignee: AMERICAN TACK & HARDWARE CO., INC., Saddle River, NJ (US)

(*) Notice: Subject to any disclaimer, the term of this patent is extended or adjusted under 35 U.S.C. 154(b) by 0 days.

(21) Appl. No.: 14/471,898

(22) Filed: Aug. 28, 2014

(65) Prior Publication Data

US 2015/0131057 A1    May 14, 2015

Related U.S. Application Data

(60) Provisional application No. 61/872,163, filed on Aug. 30, 2013.

(51) Int. Cl.
  *G03B 21/14*     (2006.01)
  *G03B 21/32*     (2006.01)
  *G03B 21/20*     (2006.01)
  *A63H 33/22*     (2006.01)

(52) U.S. Cl.
  CPC ............... *G03B 21/32* (2013.01); *A63H 33/22* (2013.01); *G03B 21/145* (2013.01); *G03B 21/204* (2013.01); *G03B 21/206* (2013.01); *G03B 21/2013* (2013.01)

(58) Field of Classification Search
  USPC .......... 353/94, 119, 79, 39, 30; 352/133, 135; 362/249.02
  See application file for complete search history.

(56) References Cited

U.S. PATENT DOCUMENTS

| | | | |
|---|---|---|---|
| 3,539,798 A * | 11/1970 | Perry | 362/308 |
| 4,739,567 A | 4/1988 | Cardin | |
| 5,136,390 A | 8/1992 | Inova | |
| 5,570,138 A | 10/1996 | Baron | |
| 6,552,699 B2 | 4/2003 | Dugdale | |
| 6,848,792 B1 | 2/2005 | De Meerleer | |
| 6,854,850 B2 | 2/2005 | Yaniv | |
| 7,118,228 B2 | 10/2006 | May | |
| 7,357,510 B2 | 4/2008 | Kim | |
| 7,553,023 B2 | 6/2009 | Grover | |
| 7,762,670 B2 | 7/2010 | Chiang | |
| 8,100,540 B2 * | 1/2012 | Huebner | 353/94 |
| 8,297,756 B2 * | 10/2012 | Ouyang et al. | 353/43 |
| 8,405,015 B1 * | 3/2013 | Klein | 250/208.1 |
| 8,545,028 B2 * | 10/2013 | Fischer | 353/94 |
| 2006/0146295 A1 | 7/2006 | Harboe | |
| 2008/0143966 A1 * | 6/2008 | Mastrosimone-Gese et al. | 353/15 |
| 2008/0266468 A1 | 10/2008 | Cossairt | |
| 2009/0015799 A1 | 1/2009 | Luciano | |
| 2009/0027629 A1 | 1/2009 | Yonezawa | |
| 2009/0213279 A1 | 8/2009 | Ichieda | |

FOREIGN PATENT DOCUMENTS

JP    2003-140595 A    5/2003

OTHER PUBLICATIONS

English Abstract for JP 2003-140595 A dated May 16, 2003.

* cited by examiner

*Primary Examiner* — William C Dowling
(74) *Attorney, Agent, or Firm* — Hedman & Costigan, P.C.; James V. Costigan; Kathleen A. Costigan

(57) ABSTRACT

An image generating system having at least two fixed projection devices that are provided with still images which are projectable onto a surface where each projection device has a light generating source controlled by an electronic or mechanical sequencing controller to selectively illuminate each projector in a predetermined sequence.

6 Claims, 5 Drawing Sheets

1

ANIMATED PROJECTION SYSTEM

CROSS-REFERENCE TO RELATED APPLICATIONS

This application claims the benefit of provisional application Ser. No. 61/872,163, filed Aug. 30, 2013.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1) Field of the Invention

This invention relates to a system for movably projecting still images on a surface in such a manner that the still images may be displayed to simulate moving images.

2) Description of Related Art

U.S. 2006/0146295 disclose a method an device for combing images from at least two light projectors to provide an invisible transition zone between at least two light projectors.

U.S. 2009/0015799 discloses a laser projection system that uses common household objects such as a lampshade as a projection screen. The disclosed system is useful as a pet exerciser system that relies on projection a series of moving images.

U.S. 2009/0027629 discloses an image projection method and projector that is capable of changing the aspect ratio or resolution of a projection image.

U.S. Pat. No. 6,552,699 discloses a multiple target projection system that has an image display that is formed by a projection assembly that uses a stationary mirror that reflects the image display to a movable mirror.

SUMMARY OF THE INVENTION

The image generating system of the invention comprises at least two fixed projection devices that are provided with different still images which are projectable onto a surface.

The light generating source in each projection device may be controlled by an electronic or mechanical sequencing controller to provide changing images on a surface in such a manner that the images appear to move on the surface. If a mechanical controller is used, a typical electric motor driven timer may be use to switch the projector on and off at predetermined intervals. An electronic system is preferred as it allows for greater flexibility in varying the on/off switching of the projectors.

It is a first object of the invention to provide an image generating system that uses at least two fixed projectors having multiple image generating capability that permit the sequential generation of images at the same focal point or at different focal points.

It is also an object of this invention to provide an image generating system where still images are generated in a rapid sequence that simulates movement.

These and other objects and advantages of the invention will be readily apparent in view of the following description and drawings of the above-described invention.

DETAILED DESCRIPTION OF THE INVENTION

Figure 1:
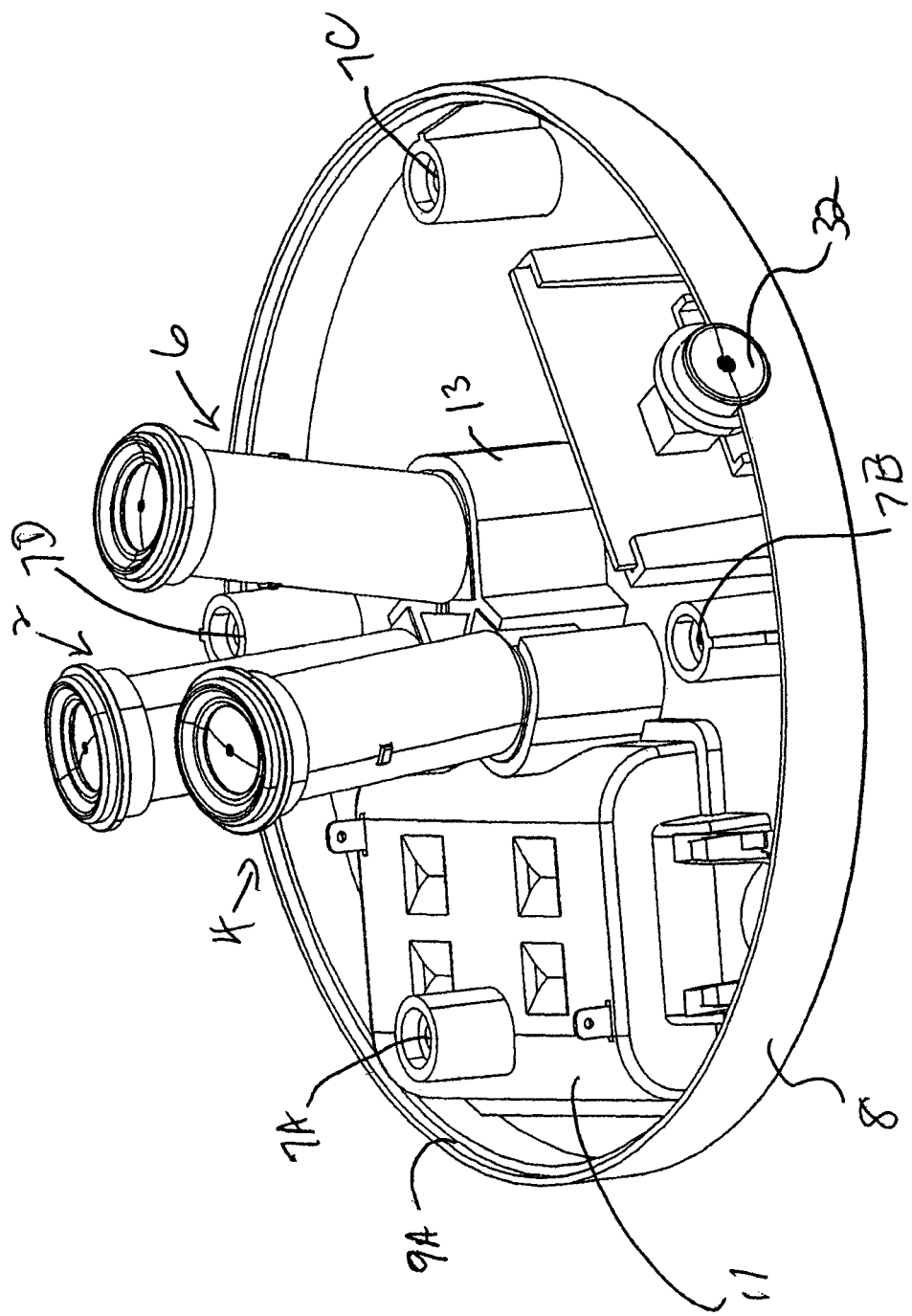
FIG. 1 is a diagram of the arrangement of three image generating projectors which are focused at three different focal points to allow for the generation of different images at different times in order to simulate movement from one focal point to another.

A preferred embodiment of the invention is shown in FIG. 1 which has a first projector 2; a second projector 4 and a third projector 6. Each projector is mounted on a flat circular base 8 that is sized to hold the three projectors and a programmable sequence circuit 10. The projectors are supported by a base element that maintains the projectors at a pre-fixed angle. Access holes 7A, 7B, 7C and 7D are provided in the base for attaching the outer housing 12 to circular base 8 to complimentary receiving holes (not shown) that will accept fastening screws.

The projectors are adapted so that they may project an image on any common household surface such as a wall, ceiling, curtain, lampshade or door for the same time interval or at different time intervals.

An outer housing 12 with three circular openings 14, 16 and 18 is sized to fit over the flat circular base 8 to form a circumferential joint 9. The preferred connection between the outer housing 12 and the circular base 8 is a half-lap joint 9A that is formed around the circumferential edges 22 and 24 of the outer housing 12 and the circular base 8. A battery compartment 11 is provided with access (not shown) from the bottom of the base.

Figure 2:
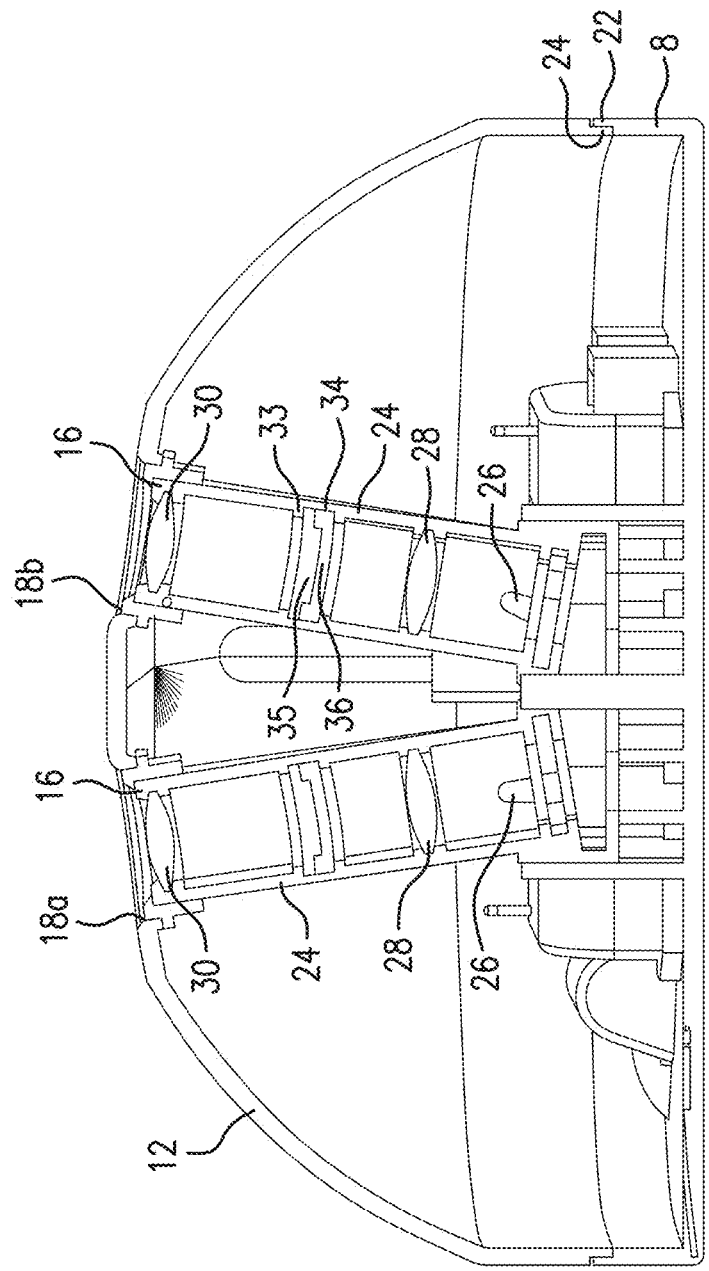
FIG. 2 is a cross-section of the housing and two of the projectors that are located in the housing.
Figure 3:
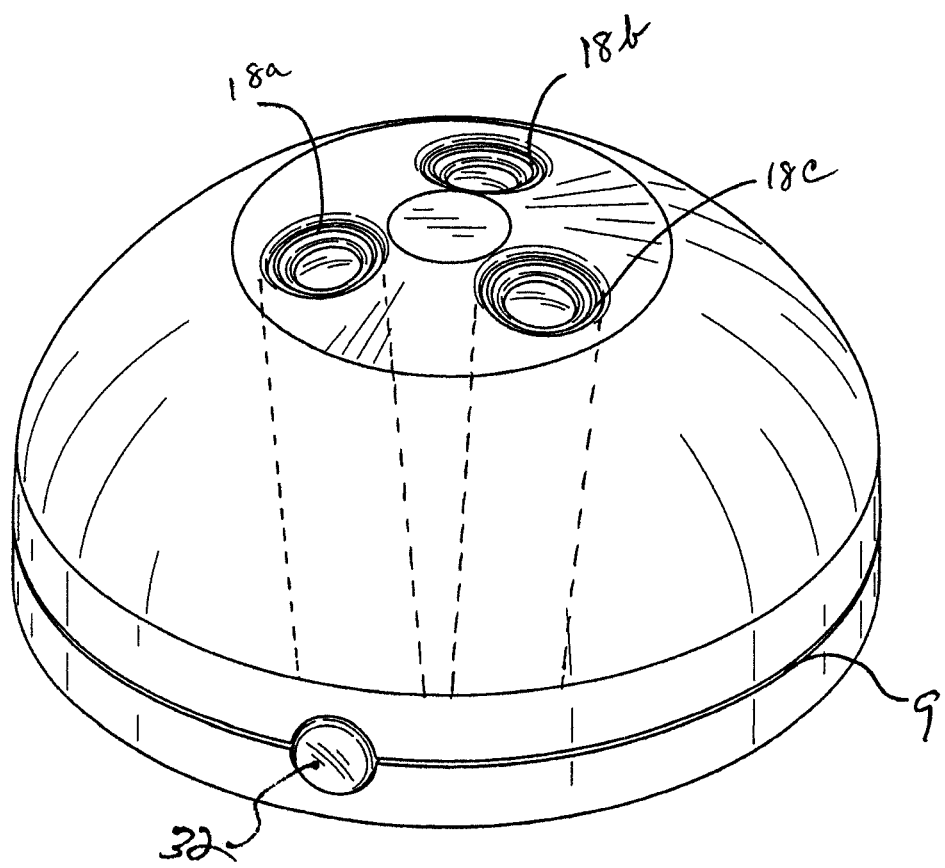
FIG. 3 is a perspective view of the outer housing which shows the positioning of the holes that allow the projector lights to emit light during the operation of the animated projection system with the angle of the internal light tubes shown in phantom so that they are angled to focus at three different focal points to allow for the generation of an image at different times in order to simulate movement from one focal point to another according to FIG. 1.

The light emitting ends of the first projector 2, second projector 4 and third projector 6 which are positioned in holes 18a, 18b and 18c in the upper part of outer housing 12 as shown in FIG. 3. The holes 18a, 18b and 18c are preferably arranged so that they are located as if on an arc of a circle at intervals of about 120° on the upper part of the outer housing 12. Two of the projectors in FIG. 2 are shown in cross-section in with a light source. The projectors may aimed by arranging the three projectors so that the longitudinal axis of each projector is inclined relative to the central vertical axis of the outer housing at an angle of about 10-30° and preferably 15-20° so that each projector is aimed at a different focal point as shown by the phantom lines in FIG. 3.

Figure 4:
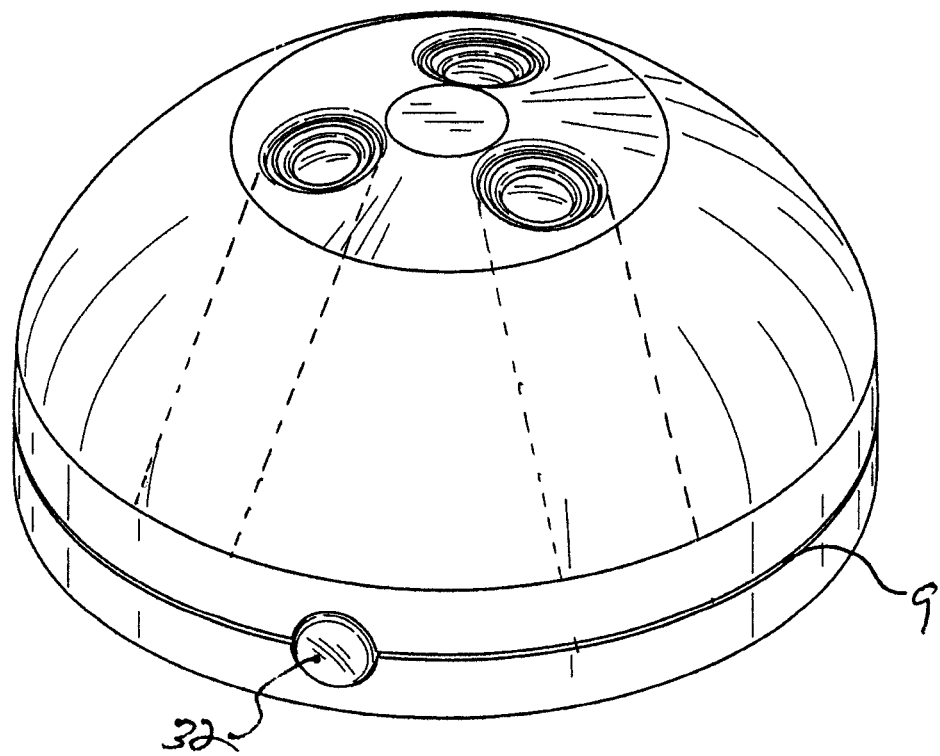
FIG. 4 is a perspective view of the outer housing which shows the positioning of the holes that allow the projector lights to emit light during the operation of the animated projection system with the angle of the internal light tubes shown in phantom so that they are angled to focus at the same focal point to allow for the generation of an image that appears to move as a result of the sequential change of the images that are projected by the image generating projectors.

FIG. 4 shows an arrangement where the projectors are shown by phantom lines to be arranged to have the same focal point so that an image may be simulated at the same focal point that appears to move by switching the projectors on and off in sequence.

Each projector comprises a tube 24 having there in a light source 26 which is preferable an LED that is connected to a controlled power source by conductors (not shown) and at least 1 double convex aspheric collimating lens 28 to project light from the source onto a transparent medium 35 with projectable image applied to the first surface 36. The transparent medium is held by two plastic carriers 33 and 34 which force the correct orientation of the first surface 36 and restrict the light passing through the film to a beam of diameter that can optimally illuminate the first surface of the at least 1 double convex aspheric projection lens 30. The projection lens 30 serves to magnify the image which is projected outwardly. The preferred distance from the projection lens 30 to an image plane is about 3 to 6 feet and preferably about 5 feet.

Figure 5:
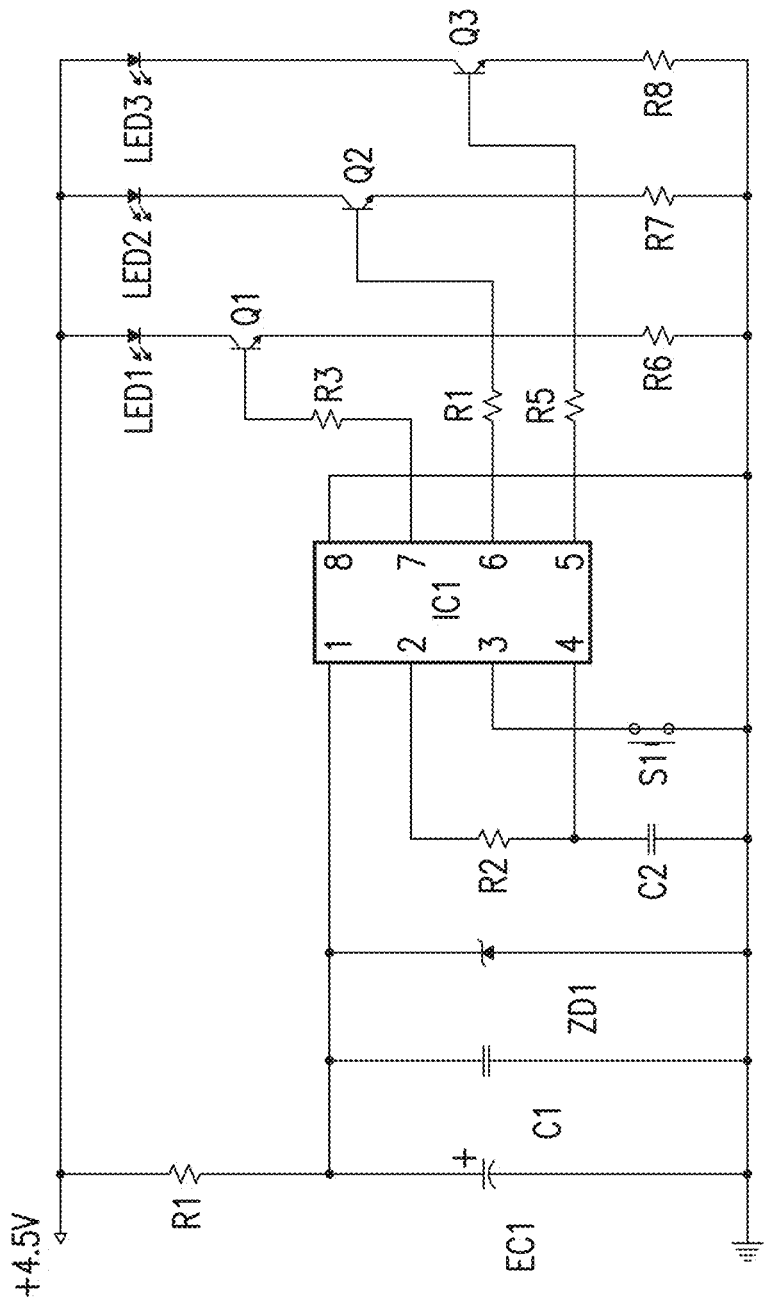
FIG. 5 is a diagram of a circuit for operating a three image projector according to the invention.

The projection system is activated by a pressure sensitive on/off switch 32 that is preferably located in a cut out section of the base 8 and the outer housing 12 that is located at the circumferential joint 9 between base 32 and outer housing 12. The light sources 26 are controlled by a microprocessor as shown in FIG. 5. Power may be supplied in the form or DC or AC that is provided by one or more batteries or electric current generated by conventional or alternate sources.

This projection light consists of 3 small projectors in a single housing. They project 3 images in close proximity one at a time in a programmed sequence onto an image plane located in front of the light at a distance of approximately 5 feet. The projectors are preloaded with fixed images that are backlit by LED light sources. The images may be cartoon characters, symbols, letters or geometric forms, such as balls, circles, dots or the like in color or in black and white, that are made from an appropriate negative image. These light sources are controlled by a microprocessor that is programmed to display the images in a sequence that is permanently programmed into memory.

When the on/off switch 32 is activated the processor sets a timer for 20 minute operation time to carry out the following action sequence which is designed to cycle through the three projectors in a way that the same image is not always projected in the same sequence.

After the action sequence has started, the processor can be deactivated by pressing switch 32 at any time. A preferred action sequence is as follows:

1. Press on/off switch momentarily to start sequence.
2. Set program run time timer to 20 minutes enable timer interrupt to enter sleep mode when program has run for 20 minutes.
3. Picture 1 from projector 2 turns on and stays on for 10 seconds then turns off.
4. Picture 2 from projector 4 turns on for 1 second then turns off.
5. Picture 3 from projector 6 turns on for 1 second then turns off.
6. Picture 1 from projector 2 turns on for 1 second then turns off.
7. Picture 2 from projector 4 turns on and stays on for 10 seconds then turns off.
8. Picture 3 from projector 6 turns on for 1 second then turns off.
9. Picture 1 from projector 2 turns on for 1 second then turns off.
10. Picture 2 from projector 4 turns on for 1 second then turns off.
11. Picture 3 from projector 6 turns on for and stays on for 10 seconds then turns off.
12. Picture 1 from projector 2 turns on for 1 second then turns off.
13. Picture 2 from projector 4 turns on for 1 second then turns off.
14. Picture 3 from projector 6 turns on for 1 second then turns off.
15. Go to step 3

Sequence steps 3-15 will continue for 20 minutes after the sequence is started. After 20 minutes, the microprocessor will stop the cycle, turn off the lights and place processor in sleep mode. Pressing switch 32 will wake processor from sleep and start the sequence.

As best seen in FIG. 5, the circuit for operating the projection light preferably has a 4.5V input to the control circuit that may be provided by three AAA batteries but the power could be from a different style battery or other power source such as a plug in AC to DC power adapter or solar/wind power source.

Power from the battery is supplied to R1, EC1, C1 and ZD which provide filtered 3.3V DC to power the microprocessor IC1. On IC1 Pin 1 is 3.3V (Vdd) and Pin 8 is 0 V (Vss). While the circuit in this invention uses 3.3V in other iterations this voltage could be changed to reflect the specific power requirements. Pin 2 and 4 of the processor are not used.

Input for power on and off is provided through pin 3. Pin three is normally held in the high state by internal pull up resistors. When momentary switch S1 (On/OFF) is pressed it will connect pin three to Vss which will force it to the low level.

When the batteries are installed or power is applied to input the processor is initialized. All outputs are set to the low (off) state, pin 3 is set as an input pin and interrupt on pin 3 low is enabled. Then the processor is placed in the Low power "Sleep" mode.

If the processor is in Low power "Sleep" mode when S1 is pressed the interrupt will cause It to "wake up", initialize the program and continue to sequence through the program until either 1) the processor receives a second interrupt because S1 was pressed again or 2) the Program time counter has reached the preprogrammed length of time for light operation.

If either of these events occurs then the processor will stop the sequence, set all outputs to off (low) make sure the interrupt on pin 3 is enabled and enter the low power (Sleep) mode.

While the program is running it will change the states of output pins 5, 6, and 7 according to a preprogrammed sequence. If output pin 7 is set to high it turns on transistor Q1 with gate current limited by R3. The current through Q1 turns on LED1.

The current through LED1 is limited by resistor R6. If Output pin 7 is set to low it turns off Q1 and LED1. If output pin 6 is set to high it turns on transistor Q2 with gate current limited by R4. The current through Q2 turns on LED2. The current through LED2 is limited by resistor R7.

If Output pin 7 is set to low it turns off Q2 and LED2. If output pin 5 is set to high it turns on transistor Q3 with gate current limited by R5. The current through Q3 turns on LED3. The current through LED3 is limited by resistor R8. If Output pin 7 is set to low it turns off Q3 and LED3. As the program sequence is followed the images projected on the projection plane will turn on and off giving the appearance of moving around on the projection Plane.

The invention claimed is:

1. An image generating system comprising three fixed projection devices that are provided with still images which are projectable onto a surface where each projection device has a light generating source controlled by an electronic or mechanical sequencing controller to selectively illuminate each projection device in a predetermined sequence; where said three fixed projection devices are positioned in an outer housing having a lower circular base; and where said three fixed projection devices are arranged so that the longitudinal axis of each projector is inclined relative to the central vertical axis of the outer housing at an angle of about 10-30°.

2. The image generating system as defined in claim 1 where the sequencing controller independently switches each projection device on and off at predetermined intervals.

3. The image generating system as defined in claim 2 where the predetermined intervals are the same.

4. The image generating system as defined in claim 2 where the predetermined intervals are different.

5. The image generating system of claim 1 where said projection device comprises a tube having therein a light generating source which illuminates a collimating lens and a transparent medium with a projectable image applied to a first surface of said collimating lens.

6. The image generating system of claim 1 where said light generating source controlled by an electronic sequencing controller is a battery powered microprocessor that is connected to a light emitting diode in each projection device.

\* \* \* \* \*